United States Patent [19]

Debortoli et al.

[11] 4,002,832
[45] Jan. 11, 1977

[54] LOADING COIL ASSEMBLIES FOR COMMUNICATIONS CABLES

[75] Inventors: George Debortoli; Peter McGivery Chase, both of Ottawa, Canada

[73] Assignee: Northern Electric Company, Limited, Montreal, Canada

[22] Filed: Sept. 22, 1975

[21] Appl. No.: 615,547

[52] U.S. Cl. .............. 178/46; 174/70 R; 336/65; 336/90

[51] Int. Cl.² .................. H01F 17/08

[58] Field of Search ........... 178/45, 46; 336/65 R, 336/90 R, 185; 174/70 R; 333/1

[56] References Cited

UNITED STATES PATENTS

| | | | |
|---|---|---|---|
| 1,768,240 | 6/1930 | Falk | 178/46 |
| 3,134,854 | 5/1964 | Martin, Jr. et al. | 178/46 |
| 3,691,294 | 9/1972 | Charles | 178/46 |
| 3,838,213 | 9/1974 | Georgopulos et al. | 178/46 |
| 3,845,435 | 10/1974 | Georgopulos | 336/65 |
| 3,865,980 | 2/1975 | Moser et al. | 333/1 |

Primary Examiner—Saxfield Chatmon, Jr.
Attorney, Agent, or Firm—Sidney T. Jelly

[57] ABSTRACT

Loading coils for communications cables are preloaded into magazines and prewired to terminal strips carried on the magazines. A magazine comprises a length of material, typically extruded or molded plastic material, of a channel shaped cross-section to accommodate the coils flat and side-by-side. End caps fit on each end of the magazine to retain the coils in position and also serve as mounting means in a casing. The terminal strips are mounted on an extension of one wall of the channel shaped cross-section. The preassembled magazines are then assembled in the casing a higher packing density is obtained, and the prewiring of the coils to the terminal strips provides effective orientation of the coils relative to each other to give good electrical and electronic separation and reduced cross-talk.

12 Claims, 20 Drawing Figures

LOADING COIL ASSEMBLIES FOR COMMUNICATIONS CABLES

This invention relates to loading coil assemblies for communications cables, particularly telephone cables.

Loading coils are assembled into casings and a complete assembly of coils in a casing is positioned at each predetermined position along a cable to maintain desired transmission characteristics.

Hitherto loading coils have been assembled in stacks on a dowel or similar structure or on stacked trays, the axes of the coils arranged to be coaxial. Adjacent coils are separated by a spacer — for example an insulated metal washer, or be sufficient distance to limit cross-talk. Also, because of manufacturing inconsistences in the coil windings, particularly at the beginning and ends of the windings, it is necessary to ensure that the beginnings and ends of the windings of adjacent coils are displaced radially or physically to avoid excessive magnetic coupling between coils. This positioning is provided by hand on assembly — and may require adjustment if magnetic coupling is excessive.

Further, the stacks of coils are positioned round a central access space, through which are brought the cable pairs. As this central space is as large as the largest cable to be accepted, there is considerable waste space, and an unnecessarily large casing is required.

The present invention provides for preassembly of loading coils into a magazine and wiring to terminal strips, with orientation of the coils to avoid magnetic field interference. The magazines can then be readily clipped into place for wiring to the cable pairs. As an additional feature, instead of the cable pairs being passed through the centre, the pairs are fanned out and brought alongside the magazines. No central space is thus required. Generally, a more compact and more easily assembled structure than with existing load coil cases, is provided.

The coils are placed in a magazine which comprises a length of extruded or molded material, generally plastic material, the length of the magazine being variable to accommodate differing numbers of coils. Terminal strips are held in a formation on the magazine, and end caps fit on each end to retain the coils in position prior to assembly. The end caps also serve to mount the magazines on the support structure of the casing.

The invention will be readily understood by the following description of certain embodiments, by way of example, in conjunction with the accompanying drawings, in which.

Figures 1, 2, 3, 4, 5, 6, 7:
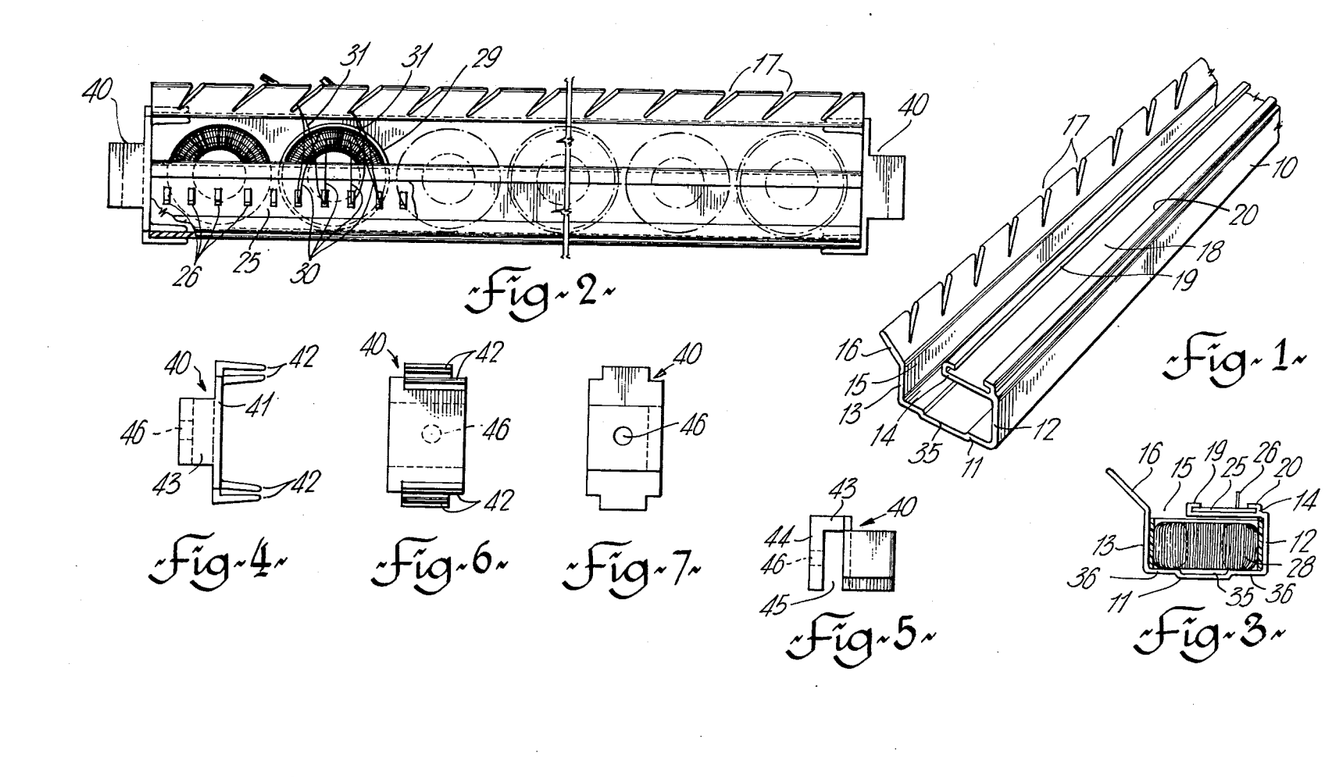
FIG. 1 is a perspective view of an extrusion or molding for a magazine.
FIG. 2 is a plan view of a magazine with coils in position.
FIG. 3 is an end view of the magazine of FIG. 2 with the end cap removed.
FIGS. 4, 5, 6, 7 and 8 are respective by plan view, side view, end view, front view and perspective view of an end cap for the magazine of FIGS. 1, 2 and 3.

As seen in FIG. 1, a main body 10 of a magazine is in the form of an extrusion having a modified channel-shaped cross-section. Thus there is a base web 11, two parallel side webs 12 and 13 and an inwardly extending top web 14 extending from the top edge of side web 12 towards side web 13. Top web 14 extends only part way across the body 10 to leave an access slot 15. At the top edge of the side web 13 extends an outwardly inclined web 16. Inclined slots 17 are formed in web 16 which acts as a fanning strip for the cable pairs.

The top surface of top web 14 is shaped to provide a shallow channel 18 with inturned edges 19 and 20. Terminal strips 25 (FIG. 2) slide into the shallow channel 18 from the end of the body 10. Conveniently each terminal strip has four terminals 26 and serves for one coil. If desired longer terminal strips could be used with more than four terminals. Also the terminals could be mounted by some other arrangement, for example ultrasonically inserted directly to the top surface of the web.

Figures 9, 13:
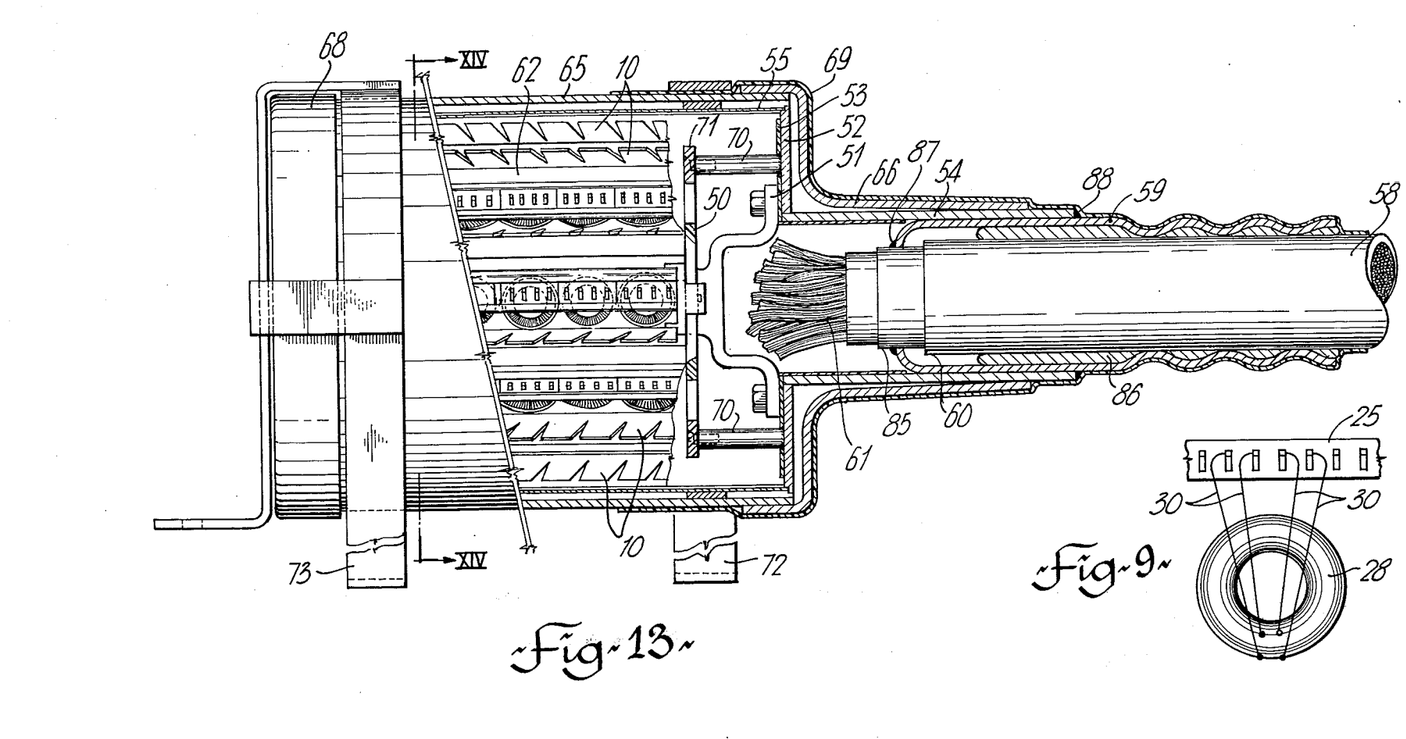
FIG. 9 is an extended plan view illustrating the attachment of the wires from the coils to the terminal strip.
FIG. 13 illustrates a loading coil case, partly in longitudinal cross-section, having two circles of magazines.

The arrangement of coils and terminal strips is seen in FIGS. 2 and 3, coils 28 being shown in the main body 10, together with associated terminal strips 25. Each alternate coil is surrounded by a plastic sleeve 29. Attaching of the wires 30 from the coils 28 to the terminals 26 to a large extent prepositions the coils so that the beginnings and ends of the windings, which are at the positions at which the wires 30 extend from the coil, are not adjacent to each other in adjacent coils, as seen in FIG. 9. This positioning prevents excessive magnetic coupling between adjacent coils. Generally the coils are positioned as illustrated in FIG. 2. The conductors from the cable are indicated at 31.

The coils are a fairly close fit in the main body 10 and are slid in from one end. To reduce friction between coils and the base web 11 this is shaped to have a recessed centre portion 35 and raised side portions 36, although this is not essential. This is seen quite clearly in FIG. 3. The recessed portion allows for a rear entrance slot to the coils when potting the coils with a polyurethane type filler compound.

The coils can be fed in from both ends of the body 10 or only from end, as desired. If the magazine is of flexible material, the coils can also be inserted via the longitudinal opening. End caps 40 are fitted on each end of the body to retain the coils in position and to provide attachment means for the magazine. In FIG. 2 an end cap 40 is shown on each end.

FIGS. 4, 5, 6 and 7 illustrate an end cap in more detail. Basically an end cap 40 comprises a channel shaped member having a base web 41 and a pair of closely spaced webs or legs 42 on each side. The webs or legs 42 of a pair are spaced apart so as to be a push fit on one of the side webs 12 and 13 of the body 10. The pairs of webs or legs are spaced so that each pair cooperate with a related side web 12 or 13. Extending from one edge of the base web 41 — referred to as the top edge for convenience, is a short web 43. Web 43 extends in the opposite direction to the webs or legs 42 and at its end is a further web 44 extending parallel to and spaced a short distance from the base web 41. These is thus provided a slot 45 which provides a means for attaching magazines to a support structure, as will be described. A hole 46 is formed in the web 44 for cooperation with a protrusion on the support structure.

After assembly of the coils into a magazine, attaching of end caps and soldering, or otherwise connecting wires 30 to the terminals 26, there is provided a compact assembly for attachment to a support structure of a casing. The connection of the wires 30 to the terminals is done at the magazine assembly stage. With the coils positioned side by-side, with their axis perpendicular to the assembly plane, there is only line contact between adjacent coils, and even here there is slight separation by the plastic sleeve 29. Thus cross-talk is reduced to a minimum. Also, as described above, the connecting of wires 30 to the terminals 26 on the terminals strips 25 — with the offset positioning of the terminal strips relative to the coil axes, tends to ensure that the coil winding starts and ends of adjacent coils are spaced apart from each other.

The number of coils per magazine can be varied, as stated, by variation of the length of the body 10. As will be described, a varying number of magazines can be mounted in a casing and it is possible to provide for a considerable variation in number of coils by varying the length of a magazine and the number of magazines in a casing. It has been found convenient, for example to provide four different lengths of magazines and three different casing sizes, that is three different numbers of magazines.

It has been found convenient also to provide for two different coil sizes, one for suburban use and a larger coil for rural areas where conditions of service can be more severe. For the larger coils, magazines having a larger cross-section are used. The same alternative magazine lengths are provided — holding fewer coils, and the number of magazines per casing are reduced to use the same casing sizes as for the smaller coils.

A particular form of casing for use with magazines as described above is illustrated in FIGS. 10, 11 and 12, with larger sizes of this form of casing illustrated in FIGS. 13, 14, 15, 16 and 17. This form of loading coil provides a more compact arrangement as compared with conventional loading coil cases. Previously a central access hole has been provided for feeding the telephone cable pairs up to the coils and back from the coils. This hole is of a diameter equivalent to the diameter of the largest cable to be connected. Generally a casing was built for a particular cable size and all items were specific to that size. As a result a large variety of items are required to be stacked to provide for all the different cable sizes.

Figures 10, 11, 12:
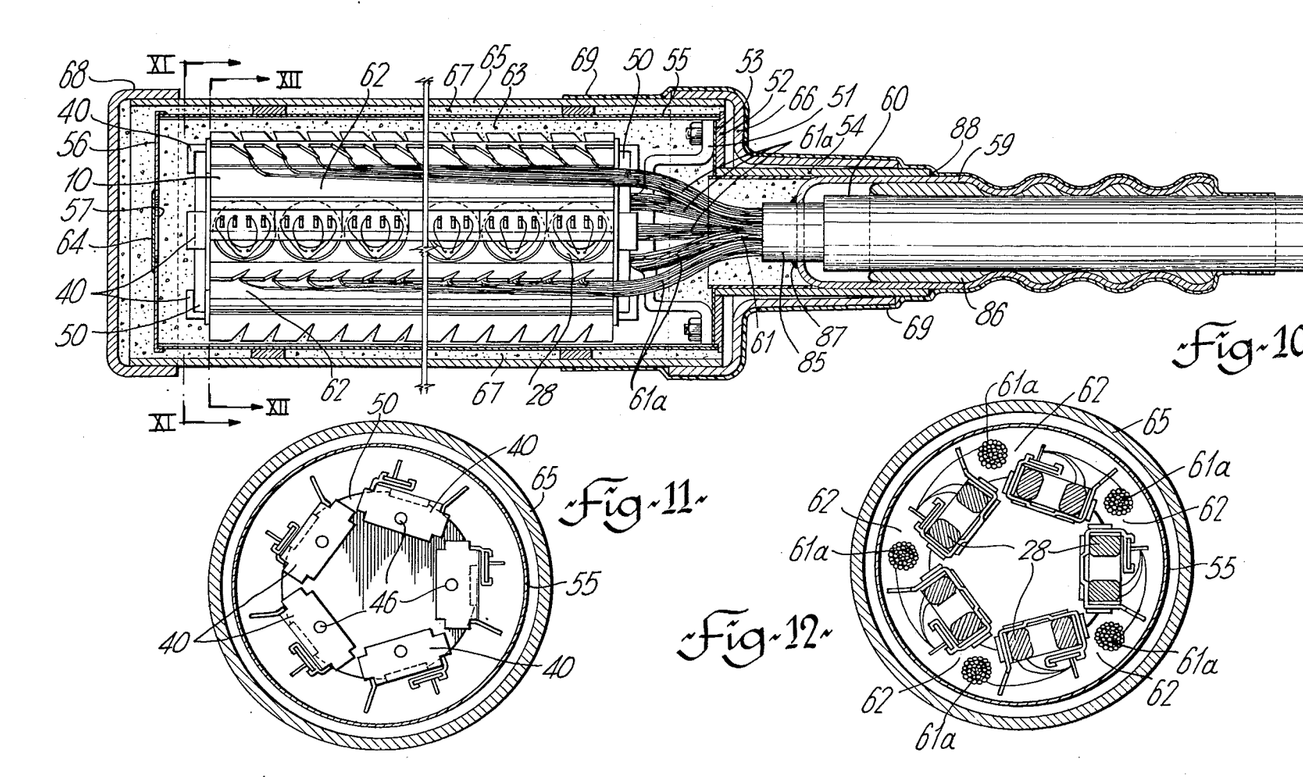
FIG. 10 is a longitudinal cross-section through one form of loading coil case having one circle of magazines.
FIGS. 11 and 12 are cross-sections on the lines XI—XI and XII—XII respectively of FIG. 10.

As illustrated in FIGS. 10, 11 and 12 a loading coil case comprises a plurality of magazines 10, each magazine holding a plurality of loading coils 28. The magazines 10 are supported at each end on a support member in the form of a disc 50. The magazines are arranged in the present example, in a single circle, and are mounted on the discs by means of the end caps 40 which clip over the edge of the disc, the disc fitting in the slot 45. A projection of the surface of the disc (see FIGS. 15 and 16) enters the hole 46. Thus the end caps 13 are both positioned and held on the disc 50.

At the lower end of the case, the disc 50 is secured to a support bracket 51 which in turn is bolted to a metal end disc 52. An insulating disc 53 is positioned between bracket 51 and end disc 52. End disc 52 has a central aperture and is secured, as by welding, to an inlet tube 54. The periphery of the end disc 52 carries a first inner casing 55, casing 55 being soldered to disc 52 and also has a further disc 56 at the upper end soldered thereto. Disc 56 has a central aperture 57.

The cable 58 enters the inlet tube 54, a lead sleeve 59 being formed on to the end of the cable sheathing 60, as will be described in more detail later. The conductors 61 of the cable are split into a number of separate bundles 61a, a bundle extending up in each channel 62 formed between two adjacent magazines 10.

After loading of the magazines on to the support members and insertion into the inner casing 55, the inner casing is soldered to the end disc 52 and the whole is filled with an expanding plastic material 63 through the aperture 57, after which the aperture 57 is closed by a disc 64. The assembly is then placed in an outer plastic casing 65 bonded or welded at the lower end to a further tube 66. The space between the inner casing 55 and outer casing 65 is also filled by expanded plastic material 67, through the open upper end, and afterwards closed by cap 68. The outer bottom portion of the casing to the cable entrance position is then enclosed in a tube of heat shrink plastic 69.

Figure 14:
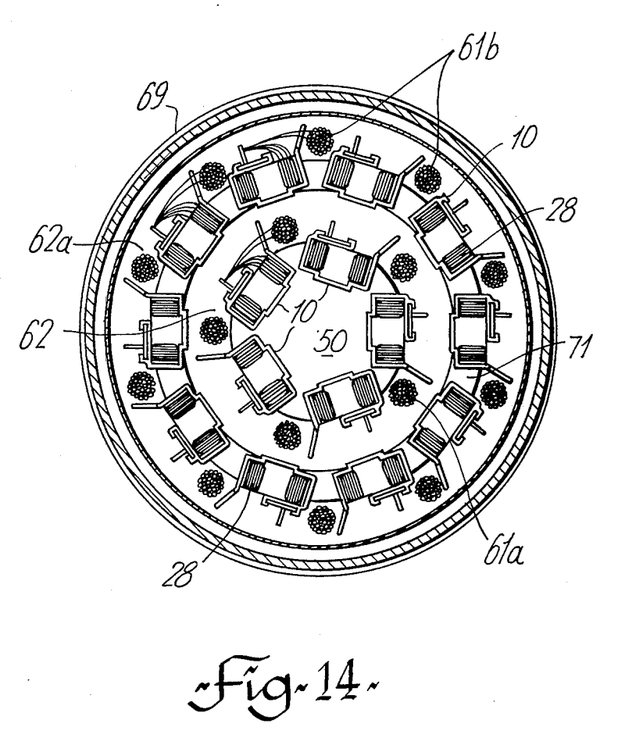
FIG. 14 is a cross-section on the line XIV—XIV of FIG. 13.

FIGS. 13 and 14 illustrate a loading coil case in which two concentric circles of magazines 10 are mounted in the case. Corresponding reference numerals are used for corresponding items in FIGS. 13 and 14, as in FIGS. 10, 11 and 12. The inner circle of magazines is mounted exactly as in FIGS. 10, 11 and 12. However, a larger end disc 52 is provided and in addition to the bracket 51, disc 52 carries a number of standoffs 70 — for example four. Standoffs 70 support a ring 71 on to which are clipped the outer circle of magazines. The ring 71 has projections which enter the holes 46 in the webs of the end caps 13.

At the top end the inner circle of magazines are mounted on a disc, as in FIG. 10, and the outer circle of magazines are mounted on a ring which is of the same form as the ring 71 at the lower end. However, at the upper end, the ring, as is also the disc, is not supported from the casing but acts as a locating and support member by its engagement with the upper ends of the magazines.

The inner and outer casings 55 and 65 are of course larger, and the spaces are again filled with expanded plastic and outer plastic sheath 69 is also provided. A larger cable 58 is accommodated and the conductors 61 are divided up into two sets of bundles — 61a and 61b. The bundles are positioned between adjacent magazines in channels 62 and 62a. Also shown in FIG. 13 are mounting brackets 72 and 73 for attachment of a case to a support structure.

Figures 8, 15, 16, 17:
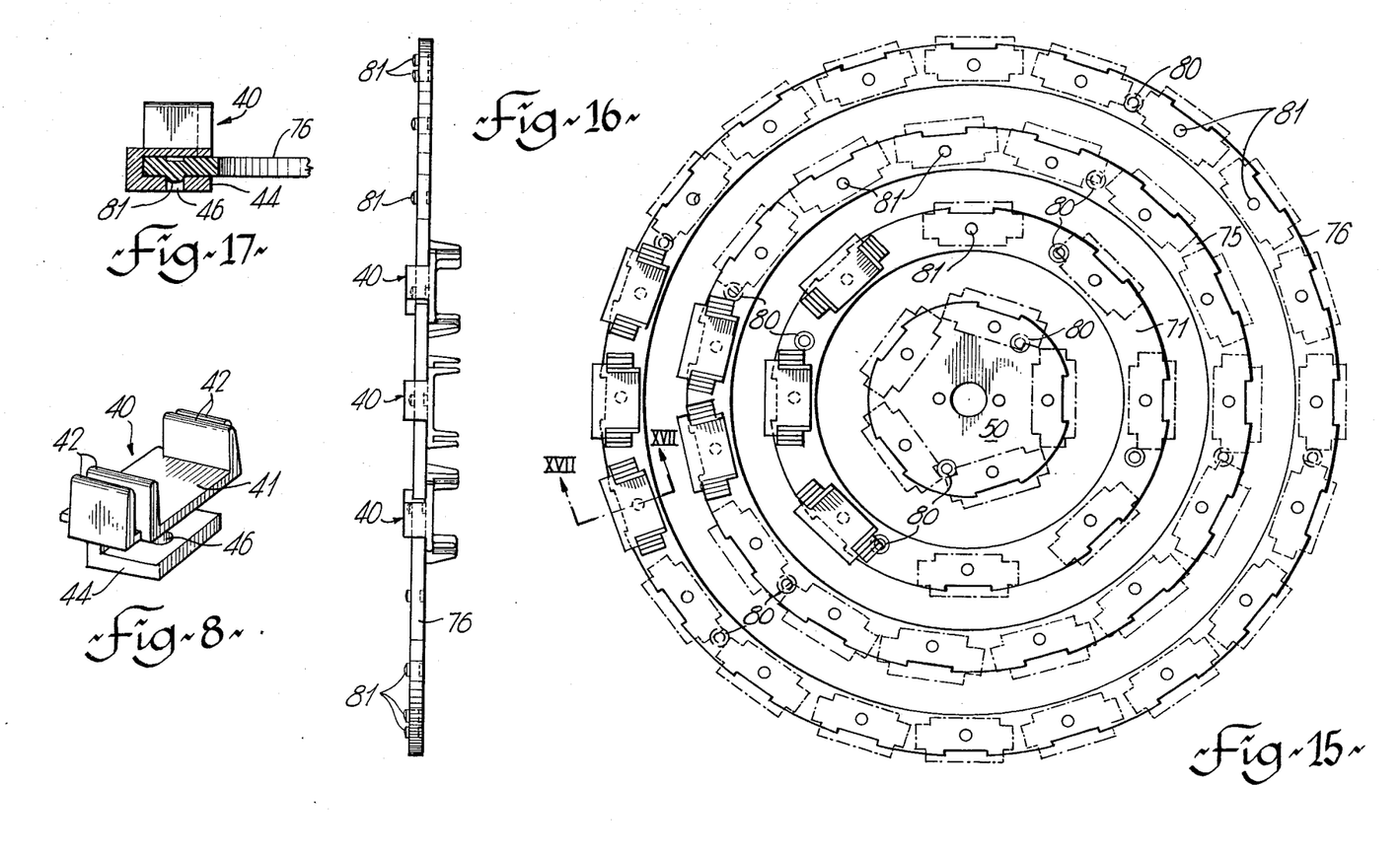
FIG. 15 is an end view illustrating the positioning of the concentric support member for a four circle assembly.
FIG. 16 is a side view of the support members in FIG. 15, with some end caps in position.
FIG. 17 is a cross-section on the line XVII—XVII of FIG. 15.

FIGS. 15, 16 and 17 illustrate the arrangement of concentric disc and rings as used at each end of an assembly for a four circle case. As particularly seen in FIG. 15 there is the disc 50, as in FIGS. 10 and 13, a first ring 71 as in FIG. 13, and then two further rings 75 and 76. The same arrangement is used for both ends of an assembly and conveniently the discs 50 and rings 71, 75 and 76 can be identical at both ends, although only those at the lower end will be mounted on supports carried by the end disc — 52 FIGS. 10 and 13. Holes 80 in the disc 50 and rings 71, 75 and 76 are shown, the disc 50 mounted on the bracket 51 — FIGS. 10 and 13 — and the rings 71, 75 and 76 mounted on standoffs — as 70 in FIG. 13 — at the lower end. At the upper end the discs and rings are connected to the end caps of the magazines to provide location and support. Projections 81 are shown on the rings and the disc, these projections entering the holes 46 in the webs of the end caps 40. A number of end caps 40 are shown in position on the rings 71, 75 and 76. FIG. 17 illustrates, by cross-section, the interengagement between a projection 81 and a hole 46.

The connection between case and cable must be mechanically sound. The size of the stub cable can vary and the occurrence of out of roundness and lack of concentricity between cable core, metal sheath and outer sheath all create difficulties in obtaining satisfactory attachment and sealing of the case to the stub cable.

Figure 18:
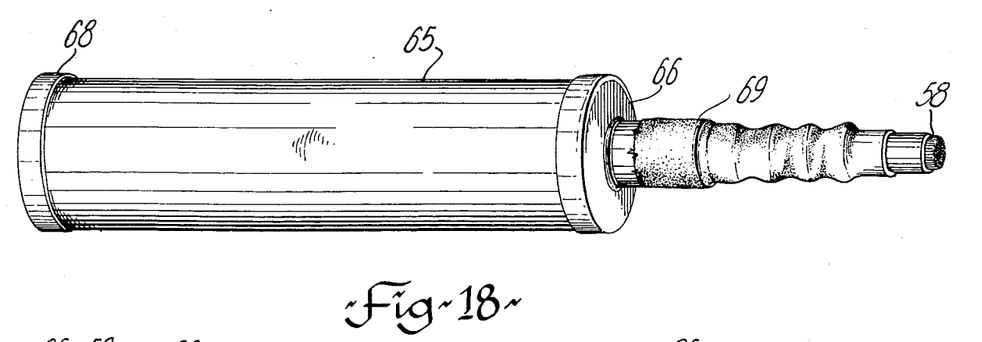
FIG. 18 is an external view of a loading coil case, illustrating the cable connection to the case.
Figure 19:
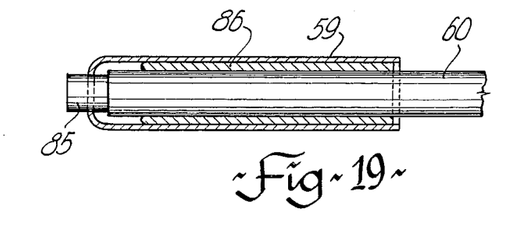
FIGS. 19 and 20 are longitudinal cross-sections illustrating stages in the making of the connection between cable and case.
Figure 20:
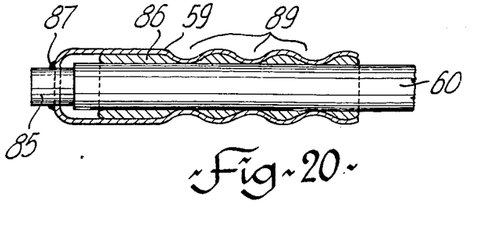

A particularly effective connection between case and cable is seen in FIGS. 10 and 13, together with FIGS. 18, 19 and 20.

As illustrated, the cable 58 enters at one end, for convenience referred to as the lower end, the case having an inlet tube assembly at the lower end. It is essential that the mechanical and electrical connection between cable and case be of very high quality. If the mechanical connection is not strong, cracking can occur due to relative movement between case and cable.

As seen in more detail in FIGS. 10 and 13, cable 58 has the outer protective sheath 60 removed at one end to expose a short length of the metal sheath 85. The metal sheath 85 in turn has been removed to expose lengths of the conductors 61 of the cable for fanning out and passage up through the case for connection to loading coils.

The lead sleeve 59 is crimped on to the outer sheath 60 over a layer of sealing tape 86. The inner end of the lead sleeve 59 is soldered to the metal sheath 85 of the cable, at 87. The outer end of the lead sleeve is sealed to the end of the outer coating or sheathing 60 of the cable by sealing tape compound, and an overlay of heat shrinkable plastic sheathing 69.

Over the lead sleeve is passed the case end comprising the disc 52 and tube 54. The tube 54 is a close fit over the crimped lead sleeve 59 and is soldered at its outer end to the lead sleeve, at 88.

FIGS. 19 and 20 illustrate two stages in preparing the end of the stub cable for attachment of the loading coil case. As seen in FIG. 19 the outer sheathing 60 has been removed to expose the metal sheath 85. A layer 86 of sealing tape, for example of an elastomeric material, is placed on the metal sheath 85. This layer 86 is madeup of one or more wrappings of sealing tape. The lead sleeve 59 is then positioned over layer 86. The cable end is then as in FIG. 16.

The lead sleeve 59 is crimped to the cable end by circumferentially extending crimps 89. The sealing compound is compressed within the crimps, providing a pressure seal and mechanical stability between the cable and lead sleeve. The end of the lead sleeve is then soldered at 87 to the metal sheath 85. Sealing compound expands out of the other end of the lead sleeve 59 to provide a seal. The base end comprising disc 52 and tube 54 is then attached to the lead sleeve.

A heat shrinkable plastic tube is shrunk over the lead sleeve and adjoining cable and outer shell of the case to form the sheathing 69. This provides an additional seal, corrosion protection at the position where the lead sleeve meets the metal tube 54, as well as providing an aesthetic finish.

By varying the thickness of the layer of sealing tape 16 and by varying the depth of the crimps 33 one size of tube 19 can accommodate varying sizes of cable.

The assembly provides a strong mechanical joint or attachment. The length of the tube 19 and its engagement with the lead sleeve provide a high strength connection from cable to case, while the layer 16 provides flexibility which avoids cracking. The end cap 28, with its tubular extension 28 engaging over the tube 19 also adds mechanical strength.

What is claimed is:

1. A loading coil assembly comprising:
a body member of a length of preformed electrically insulated material open at each end and having a channel shaped cross-section including a substantially flat base web and two spaced apart side webs extending substantially normal to said base web, and a top web on an upper part of one of said side webs, said top web extending inwardly over and spaced from said base web, said side webs spaced a distance equal to the diameter of a coil and said top web spaced from said base web at least the thickness of a coil, said base web, said side webs and said top web defining a substantially rectangular cross-section corresponding to the cross-section of a coil viewed in a direction normal to the axis of a coil;
a terminal strip on said top web and including terminals thereon;
a plurality of loading coils positioned side by side in said body member, the axes of said coils spaced apart along said body member parallel to each other and normal to the plane of said base web, each end of the winding of a coil attached to a related terminal, said top web, and said terminal strip on said top web, extending part-way over said coils; and
separate electrically insualting means positioned between each of said coils.

2. A loading coil assembly as claimed in claim 1, including a further web at the top of the other of said side webs, said further web extending in a direction away from said top web, and slots in said further web, said slots adapted for the acceptance of conductors for attachment to said terminals.

3. A loading coil assembly as claimed in claim 1, including an insulating sleeve around at least each alternate coil.

4. A loading coil assembly as claimed in claim 1, said top web including inturned edges to define a shallow channel cross-section, said terminal strip a sliding fit in said channel.

5. A loading coil assembly as claimed in claim 1, said terminal strip extending the full length of said body member.

6. A loading coil assembly as claimed in claim 1, said terminal strip divided into sections, a section for each coil.

7. A loading coil assembly, comprising:
an inner casing including first and second end discs, a disc at each end of the casing;

a first support disc mounted on said first end disc, and spaced axially therefrom in said casing;

a second support disc adjacent to said second end disc;

a plurality of assembled loading coil magazines in said casing, said magazines extending axially and spaced circumferentially around the axis of said casing, each magazine comprising:

a body member of a length of preformed electrically insulated material open at each end and having a channel shaped cross-section including a substantially flat base web and two spaced apart side webs extending substantially normal to said base web, and a top web on an upper part of one of said side webs, said top web extending inwardly over and spaced from said base web, said side webs spaced a distance equal to the diameter of a coil and said top web spaced from said base web at least the thickness of a coil, said base web, said side webs and said top web defining a substantially rectangular cross-section corresponding to the cross-section of a coil viewed in a direction normal to the axis of a coil;

a terminal strip on said top web and including terminals thereon;

a plurality of loading coils positioned side by side in said body member, the axes of said coils spaced apart along said body member parallel to each other and normal to the plane of said base web, each end of the winding of a coil attached to a related terminal;

an end cap on each end of said body member, each end cap including an outwardly extending formation for engagement with a support disc, one end cap in engagement with said first support disc and the other end cap in engagement with said second support disc;

cable entry and attachment means, attached to said first end disc;

a further casing enclosing said first casing and spaced therefrom; and expanded synthetic resin electrically insulative material filling spaces in said inner casing and between said inner casing and said further casing.

8. An assembly as claimed in claim 1, further including a heat shrinkable plastic sheath over said cable entry and attachment means and over at least that part of the further casing adjacent to said cable entry and attachment means.

9. An assembly as claimed in claim 7, further including;

a plurality of standoffs attached to said first end disc;

a ring supported on said standoffs, said ring entering circumferentially around said first support disc and spaced radially therefrom;

a further plurality of assembled loading coil magazines supported at one end on said ring;

a further ring extending circumferentially around said second end disc and spaced radially therefrom, said further plurality of assembled loading coil magazines supported at their other ends on said further ring.

10. An assembly as claimed in claim 7, further including;

a plurality of rings supported from said first end disc, and surrounding said first support disc;

a plurality of assembled loading coil magazines supported at one end of each magazine on each of said rings;

a further plurality of rings surrounding said second support disc, the assembled loading coil magazines supported at their other ends on said further rings, the magazines positioned in a series of concentric circles about the axis of the loading coil assembly.

11. An assembly as claimed in claim 10, said rings and said first support disc in a common plane.

12. An assembly as claimed in claim 10, said further rings and said second support disc in a common plane.

* * * * *